US010249407B2

(12) United States Patent
Mann

(10) Patent No.: US 10,249,407 B2
(45) Date of Patent: Apr. 2, 2019

(54) POWER SUPPLY CABLE FOR PLANES ON THE GROUND

(71) Applicant: HELU KABEL GmbH, Hemmingen (DE)

(72) Inventor: Thomas Mann, Weissenohe (DE)

(73) Assignee: HELU KABEL GmbH, Hemmingen (DE)

(*) Notice: Subject to any disclaimer, the term of this patent is extended or adjusted under 35 U.S.C. 154(b) by 0 days.

(21) Appl. No.: 15/903,266

(22) Filed: Feb. 23, 2018

(65) Prior Publication Data

US 2018/0247733 A1    Aug. 30, 2018

(30) Foreign Application Priority Data

Feb. 24, 2017    (DE) .................... 20 2017 101 038 U

(51) Int. Cl.

| | |
|---|---|
| *H01B 11/04* | (2006.01) |
| *H01B 7/04* | (2006.01) |
| *B64F 1/34* | (2006.01) |
| *B64F 3/02* | (2006.01) |
| *H01B 7/08* | (2006.01) |
| *H01B 9/02* | (2006.01) |
| *H01B 11/12* | (2006.01) |

(52) U.S. Cl.
CPC ................ *H01B 7/04* (2013.01); *B64F 1/34* (2013.01); *B64F 3/02* (2013.01); *H01B 7/041* (2013.01); *H01B 7/0869* (2013.01); *H01B 9/02* (2013.01); *H01B 11/12* (2013.01); *H01R 2201/26* (2013.01)

(58) Field of Classification Search
CPC ...................................................... H01B 11/04
USPC ......................................................... 174/113 R
See application file for complete search history.

(56) References Cited

U.S. PATENT DOCUMENTS

| | | | |
|---|---|---|---|
| 9,508,467 B2 * | 11/2016 | Pon .................... | H01B 9/003 |
| 9,590,363 B2 * | 3/2017 | Wu .................... | H01R 13/6585 |
| 2009/0294151 A1 * | 12/2009 | Li .................... | H01B 13/14 |
| | | | 174/110 SR |
| 2014/0238722 A1 * | 8/2014 | Hayashishita ......... | H01B 13/34 |
| | | | 174/115 |
| 2016/0133353 A1 * | 5/2016 | Liu .................... | H01B 3/30 |
| | | | 174/126.2 |

* cited by examiner

*Primary Examiner* — Chau N Nguyen
(74) *Attorney, Agent, or Firm* — Collard & Roe, P.C.

(57) ABSTRACT

A flexible electric cable for the electric power supply of planes on the ground is subjected to an unspooling and spooling process, the cable having a conductor layout including a plurality of insulated energy supply conductors which are arranged concentrically with respect to a longitudinal central axis of the generally circular in cross-section cable, several insulated neutral conductors which are arranged concentrically with respect to the central axis, and several insulated control conductors which are arranged concentrically with respect to the central axis. A non-metallic, tension- and compression-resistant support member is disposed at the center of the cable, which support member extends over the length of the cable. At least the energy supply conductors include CCA wires having a copper content of at least 15%.

10 Claims, 1 Drawing Sheet

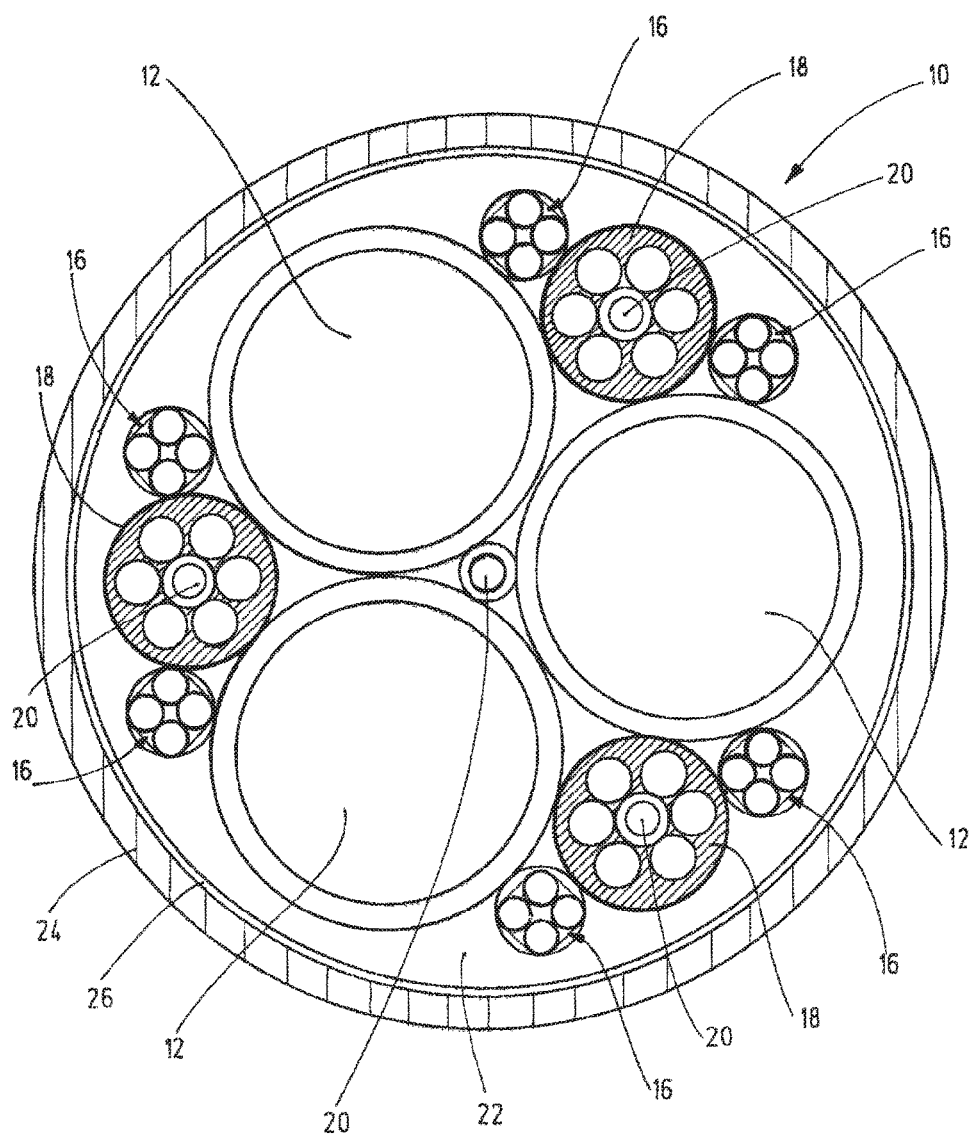

POWER SUPPLY CABLE FOR PLANES ON THE GROUND

CROSS REFERENCE TO RELATED APPLICATIONS

Applicant claims priority under 35 U.S.C. § 119 of German Application No. 20 2017 101 038.4 filed Feb. 24, 2017, the disclosure of which is incorporated by reference.

BACKGROUND OF THE INVENTION

The invention relates to a flexible electric cable for the electric power supply of planes on the ground, in which the cable is subjected to an unspooling and spooling process, the cable having a conductor layout comprising a plurality of insulated energy supply conductors which are arranged concentrically with respect to a longitudinal central axis of the generally circular in cross-section cable, a plurality of insulated neutral conductors which are arranged concentrically with respect to the central axis, and a plurality of insulated control conductors which are arranged concentrically with respect to the central axis, wherein there is a non-metallic, tension- and compression-resistant support member disposed at the center of the cable, which support member extends over the length of the cable.

In the standard form of the invention three insulated phase conductors are stranded around a centrally-located, non-metallic, tension- and compression-resistant element, and in the remaining three interspaces there are respectively disposed one electrically insulated neutral conductor with a one-third conductor cross-section, as well as to both sides of this neutral conductor respectively for control conductors.

SUMMARY OF THE INVENTION

It is the object of the invention to provide a cable of the type described above, which has a weight per unit length that is a low as possible while maintaining a high degree of electrical and mechanical load capacity.

In order to optimize the flexibility of the individual elements in the stranded cable, their surfaces are fully covered with a slippery foil.

Covering the stranded assembly there is extruded an abrasion-resistant synthetic inner/outer sheath which fills out the gusset spaces between the conductors and which comprises an integrated torsion-resistant element made of high-strength synthetic fibers.

The cable is trimmed to lengths of up to 35 meters (m) and spooled on electrically driven specialty cable drums, and can be spooled off and onto these in daily use.

The cable drums are located either subsurface or on a boarding bridge. The cable with its connector is manually brought to the parked plane over a distance of 30 m to 35 m by the ground crew of the airport.

Pulling the cable from the cable drum, dragging the cable of the rough surface of the airport to the plane-side connector, the supply of up to 90 kilowatts (kW) power to the plane for hours, and the return of the electrically heated cable to its cable drum causes a high degree of mechanical and thermal stress on the cable, not least due to the high weight and therefore high frictional load on the cable on the ground of the airport.

A high tension force is needed to pull the cable on the airport ground over a distance of up to 35 m to the plane. This high force must be exerted, due to the manual operation of spooling and unspooling the cable, by an airport worker and is close to the limit of physical capabilities.

Apart from an optimum mechanical design of the cable assembly, which is to ensure more than 100,000 duty cycles of the cable (spooling/unspooling) as well as an electric load of 90 kW over one to two hours per cycle without failure, the main object of the invention is to achieve a weight reduction of at least 20% compared to a cable with copper conductors while retaining a similar duty life.

The reduction in cable weight by that amount results in a significant physical relief for the worker.

According to the solution of the object according to the invention, the cable has the following construction of the individual components:

1) Construction of the phase conductor (104 millimeter$^2$ (mm$^2$)) (12)

1.1 The individual wire of the strand is a CCA-15 wire (Copper Clad Aluminum) with a copper cross section portion of 15%. The individual wire diameter of the CCA-15 wire is in the region of 0.15 to 0.30 mm. The electrical conductivity κ of CCA-15 wires is on average 38.5 Siemens/meter (S/m) compared to copper with κ=58 S/m.

1.2 Conductor bundle:

The individual bundles of the phase strand consist of a plurality of stranded CCA conductors (for example 77×0.30). The twist pitch length of these is in the region from 14 to 16×d (d=bundle diameter in mm). The twist direction of all bundles is Z (right); with the exception of the core bundle of the strand which is twisted in S direction (right).

1.3 Bundle stranding: The bundles according to point 1.2 are stranded about the S-core bundle in the S direction in a plurality of concentric stranding layers (for example 1+6+12). The stranding angle relative to the phase conductor axis is the same for all stranding layers. The twist pitch length is in the region of 10 to 13×D (D=phase conductor diameter).

1.4 Conductor sheathing of the phase conductor:
Overlapping wrapping of a fibrous tape (for example polyester fiber tape).

2) Construction of the neutral conductor (35 mm$^2$): (three-part neutral conductor) (18)
a) In copper design (3×12 mm$^2$)
b) In CCA design (3×18 mm$^2$)

The cable according to the invention (to achieve a >20% weight reduction) is designed with a three-part copper neutral conductor for mechanical reasons (2.a). In further development of the invention idea the neutral conductor can be designed similar to the phase conductor (2.b), but in this case requires for a mechanical optimization CCA-15 wires <0.3 mm as well as a highly tension and compression resistant, non-metallic central element (for example GRP, glass-fiber reinforced plastic), which is integrated into the three-part neutral conductor.

3) Control conductors 1.0 mm$^2$ (16)

In the standard design they are made of copper with a thermoplastic elastomer (TPE) insulation. Four strands stranded to form a quad and a slippery foil (for example non-sintered polytetrafluoroethylene (PTFE)) wound overlapping.

4) Strand insulation of the phase and neutral conductors (14)

Cross-linked polymer (for example cross-linked polyethylene), colored black or blue. This is topped by a slippery foil wrapping of overlapping tape (for example non-sintered PTFE).

5) Central element (20)

Non-metallic, tension- and compression-resistant support member (for example GRP, glass-fiber reinforced plastic) with an additional slippery foil wrapping.

6) Inner and outer sheaths (22 and 24)

Mechanically resistant TPE material, flame resistant (for example thermoplastic polyurethane (TPU)).

7) Torsional protection (26)

High-tensile strength synthetic yarn meshwork (for example Vectran yarn), embedded between the glued-together inner and outer sheaths.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

The sole FIGURE shows a cross section through a flexible electric cable according to an embodiment of the invention.

DETAILED DESCRIPTION OF PREFERRED EMBODIMENTS

In the following the invention is described with reference to an embodiment shown schematically in the drawing.

The sole FIGURE shows a cross section through a flexible electric cable 10 for the power supply of planes on the ground, where the cable is subjected to unspooling and spooling before and after each deployment. The cable has a conductor layout comprising a plurality of insulated energy supply conductors 12 which are arranged concentrically with respect to a longitudinal central axis of the generally circular in cross-section cable 10, a plurality of insulated neutral conductors 18 which are arranged concentrically with respect to the central axis, and a plurality of insulated control conductors 16 which are arranged concentrically with respect to the central axis. In the center of the cable 10 there is a non-metallic, tension- and compression-resistant support member 20 which extends over the length of the cable. At least the energy supply conductors 12 comprise CCA (Copper Clad Aluminum) wires having a copper content of at least 15%. The neutral conductors 18 also comprise CCA wires having a copper content of at least 15%. Further, the neutral conductors 18 each comprise a centrally disposed, tension- and compression-resistant element 20 made of a fiber-reinforced plastic material.

The energy supply conductors 12 and the neutral conductors 18 comprise a cross-linked insulation material, for example cross-linked polyethylene. Additionally, the energy supply conductors 12 and the neutral conductors 18 comprise a wrapping consisting of a slippery foil, for example non-sintered PTFE.

The support element 20, disposed centrally in the cable 10 and made of fiber-reinforced plastic material, comprises a wrapping of slippery foil, for example non-sintered PTFE foil.

Four control conductors 16 at a time are stranded to form a quad, and comprise a wrapping of slippery foil, for example non-sintered PTFE foil.

The cable 10 comprises a TPE inner sheath 22 and a TPE outer sheath 24, and an anti-torsional protective mesh consisting of high strength synthetic fibers, for example a mesh made of Vectran fibers, is disposed between the two sheaths. The inner sheath 22 is glued to the outer sheath 24.

Although only a few embodiments of the present invention have been shown and described, it is to be understood that many changes and modifications may be made thereunto without departing from the spirit and scope of the invention.

What is claimed is:

1. A flexible electric cable for the electric power supply of planes on the ground, wherein the cable is subjected to an unspooling and spooling process, the cable having
    a conductor layout comprising a plurality of insulated energy supply conductors arranged concentrically with respect to a longitudinal central axis of the generally circular in cross-section cable,
    a plurality of insulated neutral conductors arranged concentrically with respect to the central axis, and
    a plurality of insulated control conductors arranged concentrically with respect to the central axis,
    wherein there is a non-metallic, tension- and compression-resistant support member disposed at the center of the cable,
    wherein said support member extends over the length of the cable,
    wherein at least the energy supply conductors comprise CCA (copper clad aluminum) wires having a copper content of at least 15%, and
    wherein the neutral conductors each comprise a centrally disposed, tension- and compression-resistant element made of a fiber-reinforced plastic material.

2. The cable according to claim 1, wherein also the neutral conductors comprise CCA wires having a copper content of at least 15%.

3. The cable according to claim 1, wherein the energy supply conductors and the neutral conductors comprise a cross-linked insulation material.

4. The cable according to claim 1, wherein the energy supply conductors and the neutral conductors comprise a wrapping comprising a slippery foil.

5. The cable according to claim 1, wherein the plurality of control conductors comprise a plurality of quads, each quad formed by four control conductors stranded together, and wherein a wrapping of slippery foil is wound over the quad.

6. A flexible electric cable for the electric power supply of planes on the ground, wherein the cable is subjected to an unspooling and spooling process, the cable having
    a conductor layout comprising a plurality of insulated energy supply conductors arranged concentrically with respect to a longitudinal central axis of the generally circular in cross-section cable,
    a plurality of insulated neutral conductors arranged concentrically with respect to the central axis, and
    a plurality of insulated control conductors arranged concentrically with respect to the central axis,
    wherein there is a non-metallic, tension- and compression-resistant support member disposed at the center of the cable,
    wherein said support member extends over the length of the cable,
    wherein at least the energy supply conductors comprise CCA (copper clad aluminum) wires having a copper content of at least 15%, and
    wherein the support element, disposed centrally in the cable, comprises a fiber-reinforced plastic material and a wrapping of slippery foil.

7. The cable according to claim 6, wherein the wrapping of slippery foil comprises non-sintered polytetrafluoroethylene foil.

8. A flexible electric cable for the electric power supply of planes on the ground, wherein the cable is subjected to an unspooling and spooling process, the cable having
- a conductor layout comprising a plurality of insulated energy supply conductors arranged concentrically with respect to a longitudinal central axis of the generally circular in cross-section cable,
- a plurality of insulated neutral conductors arranged concentrically with respect to the central axis, and
- a plurality of insulated control conductors arranged concentrically with respect to the central axis,
- wherein there is a non-metallic, tension- and compression-resistant support member disposed at the center of the cable,
- wherein said support member extends over the length of the cable,
- wherein at least the energy supply conductors comprise CCA (copper clad aluminum) wires having a copper content of at least 15%,
- wherein the cable comprises a thermoplastic elastomer inner sheath and a thermoplastic elastomer outer sheath, and
- wherein an anti-torsional protective mesh comprising high strength synthetic fibers is disposed between the two sheaths.

9. The cable according to claim 8, wherein the high strength synthetic fibers are spun from liquid-crystal polymers produced by polycondensation of 4-hydroxybenzoic acid and 6-hydroxynaphthalene-2-carboxylic acid.

10. The cable according to claim 8, wherein the inner sheath is glued to the outer sheath.

\* \* \* \* \*